United States Patent [19]

Sinha

[11] 4,150,045

[45] Apr. 17, 1979

[54] MgO IMPREGNATED ACTIVATED CARBON AND ITS USE IN AN IMPROVED VEGETABLE OIL REFINING PROCESS

[75] Inventor: Rabindra K. Sinha, Coraopolis, Pa.

[73] Assignee: Calgon Corporation, Pittsburgh, Pa.

[21] Appl. No.: 898,742

[22] Filed: Apr. 24, 1978

Related U.S. Application Data

[62] Division of Ser. No. 779,954, Mar. 22, 1977, Pat. No. 4,125,482.

[51] Int. Cl.$^2$ ............................ C11B 3/04; C11B 3/06
[52] U.S. Cl. .................................... 260/424; 260/425; 260/426; 260/427; 252/447
[58] Field of Search ............... 260/424, 425, 426, 427, 260/428, 428.5

[56] References Cited

U.S. PATENT DOCUMENTS

| | | | |
|---|---|---|---|
| 2,454,937 | 11/1948 | Moyer | 260/425 |
| 2,639,289 | 5/1953 | Vogel | 260/428 |
| 2,746,867 | 5/1956 | Werly | 260/424 |
| 2,781,301 | 2/1957 | Payne | 260/428 |

*Primary Examiner*—John Niebling
*Attorney, Agent, or Firm*—Raymond M. Speer; Edmunde D. Riedl; Harry E. Westlake, Jr.

[57] ABSTRACT

A novel impregnated activated carbon, containing from about 1.0 percent to about 15.0 percent by weight of MgO, has been found to be useful in a method of decolorizing a crude vegetable oil or a degummed vegetable oil, and removing organic acids therefrom, as well as in a process for making a refined edible vegetable oil wherein a crude vegetable oil is degummed, passed through the impregnated activated carbon, and subjected to steam distillation at reduced pressure. A novel method of preparing the MgO impregnated activated carbon has also been discovered.

6 Claims, No Drawings

MGO IMPREGNATED ACTIVATED CARBON AND ITS USE IN AN IMPROVED VEGETABLE OIL REFINING PROCESS

This is a division of application Ser. No. 779,954 filed Mar. 22, 1977 now U.S. Pat. No. 4,125,482.

BACKGROUND OF THE INVENTION

The present invention is concerned with a MgO impregnated activated carbon and its use in an improved process for making a refined edible vegetable oil. The present invention is also concerned with a method of decolorizing a crude vegetable oil or a degummed vegetable oil, and removing organic acids therefrom. The present invention also deals with a method of preparing the MgO impregnated activated carbon. More particularly, the improved process of the present invention for making a refined edible vegetable oil comprises the steps of degumming a crude vegetable oil, passing the degummed vegetable oil through a bed of granular activated carbon impregnated with from about 1.0 percent to about 15.0 percent by weight of MgO, and subjecting the treated oil to steam distillation at reduced pressure.

The vegetable oils to which the present invention is applicable are such edible vegetable oils as soya or soybean oil, corn oil, cottonseed oil, peanut oil, sesame seed oil, rapeseed oil, olive oil, palm oil, palm kernel oil, coconut oil, and babassu oil, among others.

The improved refining process and treatment methods of the present invention have proven especially suitable in refining of soybean oil, and they are, therefore, particularly applicable thereto. Soybean oil is, moreover, the most important vegetable oil produced in the United States, comprising about 82% of the present total annual vegetable oil production. Thus, production of soybean oil in the United States is an important and extensive industry, with current annual production of edible soya oil being approximately 9.5 billion pounds. While crude soybean oil is stable and nonreverting in nature, it has a dark color and a strong odor and taste which make it regarded as unpalatable in that state. Consequently, a number of techniques have been employed previously in the art to refine the crude soybean oil. The resulting product, while initially a light colored oil with a bland and agreeable flavor, in many cases unfortunately reverts by stages to more unpleasantly flavored forms after standing for a short period of time.

In accordance with the improved refining process of the present invention, it is possible to eliminate two conventional refining steps which are cumbersome and wasteful. Despite the eliminated steps, the end product refined oil is acceptable with respect to prevailing industry standards for taste, odor, and color, and is, moreover, storage stable over the normal shelf life period of from one to three or more months. The end product refined oil produced in accordance with the present invention is thus comparable to oils produced by conventional refining processes in these respects.

The MgO impregnated activated carbon of the present invention is able to remove not only substantial quantities of free fatty acids from a crude vegetable oil, but is also able to remove substantial quantities of phospholipids and peroxide compounds from the crude vegetable oil.

Free fatty acids, referred to herein generally as organic acids, are present in crude vegetable oils and may result, as well, from hydrolysis of the crude vegetable oil responsive to a number of conditions. The free fatty acids may be saturated, for example, caproic, lauric, palmitic, stearic, and myristic acids, or unsaturated, for example, oleic, linoleic, and linolenic acids.

Phospholipids, or phosphatides, are lipoid substances that occur in cellular structures and contain esters of phosphoric acid. The aminophosphatides, or lecithins, which are mixed esters of glycerol and choline with fatty acids and phosphoric acid, are especially common. For example, the phospholipid content of crude soybean oil ranges from 1.1 to 3.2% by weight, and averages 1.8%.

Free fatty acids are conventionally removed by means of caustic refining, as well as steam distillation under reduced pressure, both of which are described in detail below. Phospholipids are conventionally removed by means of degumming, which is also described in detail below.

Use of the MgO impregnated activated carbon of the present invention provides not only an improved process for making a refined edible vegetable oil, but also may provide a method of decolorizing a crude vegetable oil or a degummed vegetable oil, as well as of removing organic acids from such oils. The present invention thus provides a complete refining process for producing edible vegetable oils, as well as more intermediate processes for improving the quality of a crude vegetable oil or degummed vegetable oil with respect to decolorizing thereof and removing organic acids therefrom.

Conventional processes heretofore employed for refining vegetable oils, particularly soybean oil, have employed a number of distinct treatment steps. However, most often these have consisted of degumming, alkali neutralization, water washing, bleaching, and deodorizing, employed in that order. See, for example, U.S. Pat. No. 3,629,307.

1. The step of degumming removes various mucilaginous products, primarily protein or albuminoid substances and phospholipids, from the crude vegetable oil. These phospholipids, primarily lecithin, cephalin and inositol phosphatide, are primarily responsible for the rather strong and bitter flavor and aroma of the crude oil. They are responsible, moreover, for fouling of processing equipment employed in subsequent refining operations, if they are not successfully removed. The degumming process is primarily carried out at the extraction mill, where alkali refining may or may not be carried out. To a much lesser extent, degumming may be done by the refiner at another location. In general, the degumming process consists of adequately mixing with the crude vegetable oil, an organic acid such as phosphoric acid or acetic acid, followed by a little water. The resulting hydrated, mucilaginous globules are subsequently removed from the oil by centrifuging. The step of degumming may also be carried out without the use of acid, by simply adding water. Both types of degumming will be described in more detail hereinafter. While substantially all of the phospholipids should be removed, to a level at least below 2.0 p.p.m., as phosphorus, it has not been considered possible to accomplish such a result by conventional water degumming alone. Unless substantially all of the phospholipids are thus removed, a dark colored oil will be produced by decomposition of the remaining phospholipids at the elevated temperatures encountered during the final step of vacuum steam stripping and deodorizing. This dark colored material is very difficult to remove by ordinary refining or bleaching and imparts an off-flavor to the refined vegetable oil final product. In addition, the phospholipids tend to chelate any metal ions contained in the vegetable oil being refined, and will tend to carry these over into the refined oil final product, where they can cause undesired oxidation of the refined vegetable oil final product. Moreover, the phospholipids recovered, particularly lecithin, continue to possess good market value as a by-product for sale in nonrelated fields, for use, for example, as an emulsifying agent.

Various methods of degumming have been employed in the past, including the use of various aliphatic and aromatic hydrocarbon and other compositions which are solvents for the vegetable oil, but nonsolvents for the phospholipids and other mucilaginous products. Acetone is an example of a suitable solvent. As the solvent is added to the vegetable oil, the decreased solubility of the phospholipids and other impurities causes them to precipitate out of the oil. Separation can then be achieved simply by filtration. The separated oil is then treated to remove the added solvent, for example, by distilling under a moderate vacuum. See, for example, U.S. Pat. No. 2,117,776. However, such methods have the serious drawback of requiring the use of often hazardous solvents.

The preferred method of degumming for use in the improved refining process of the present invention is one whereby the phospholipids and other mucilaginous products are simply hydrated, precipitated, and separated, desirably by a continuous process. As before stated, an acid such as 85% phosphoric acid is also used before the addition of the water. The amounts used may vary from 300 to 2,000 p.p.m. by volume of oil. The amount of water may be from 1.0 to 3.0% by volume. The temperature may be from 100° to 160° F. The refining process of the present invention may employ either (1) the simple degumming method using water alone, (2) the acid degumming method using water and acid together, or (3) a combination or sequence of the degumming methods (1) and (2). The mixture is introduced into a continuous centrifuge in which it is heated and caused to circulate continuously, whereby the mucilaginous products are completely hydrated and the aqueous phase containing these hydrated mucilaginous products is finally discharged. See U.S. Pat. No. 3,206,487.

2. The second step in the conventional oil refining process is alkali neutralization of the oil to remove free fatty acids and other impurities. Usually, this neutralization is accomplished simply by treating the oil with an aqueous solution of sodium hydroxide or other strongly alkaline reagent. The free fatty acids in the oil, generally present in amounts of from 0.5 to 3.0% by weight, are removed as precipitated soaps produced by the reaction of the fatty acids and alkaline reagent. The soap thus formed may be removed by centrifuging and the separated soapstock disposed of in some manner. However, handling of these soapstocks has presented considerable problems to the vegetable oil refiner. Usually, these soapstocks are acidulated and free fatty acids are recovered. Nevertheless, waste-products are produced which cannot be reaily disposed of without creating problems of environmental pollution. As a final step, the oil is then washed with water to remove virtually all traces of soap, and the oil is then dryed to remove any dissolved or emulsified water which may be present.

3. The third step in the conventional vegetable oil refining process is bleaching to remove pigments remaining in the oil after the previous refining steps. Such pigments comprise the carotenoids and chlorophyll, among others. Typically, the bleaching step is carried out under vacuum at a moderate temperature in the range of 210° to 250° F., and in the presence of an activated earth such as fuller's earth, perhaps admixed with a lesser amount of activated carbon. After the bleaching has been carried out, it is necessary to filter out the bleaching earth and activated carbon and pigment products adsorbed thereon. It has been found that during bleaching some free fatty acid products are generated and that the acid value of the oil is raised to about double that existing at the end of the alkali neutralization process.

4. The fourth step in the conventional refining of vegetable oils is deodorizing. During this step live steam is passed through the vegetable oil while it is maintained under a high vacuum and at elevated temperatures. The temperature usually ranges from 460° to 530° F. and the vacuum is maintained at 4 to 6 mm Hg. The process may require from one and onehalf to seven hours. During the process most of the free fatty acids remaining in the vegetable oil are distilled off. Most of the remaining pigment products are destroyed during this step as well. The acid value and color of the oil are thus improved, and the odor and flavor are made acceptable. However, if any appreciable quantity of phospholipids remains, the elevated temperatures experienced during this step would result in a darkening of the oil. For most vegetable oils it has been considered necessary to utilize both alkali neutralization as well as deodorization in order to remove most of the free fatty acid content of the vegetable oil, as well as to get a bland-tasting and odor free edible oil.

The conventional deodorizing step has been improved by variation of the parameters involved and other modifications. See, for example, U.S. Pat. No. 3,506,696.

The vegetable oil refining method of the present invention is an improvement over the conventional refining process described in the paragraphs above since it eliminates the conventional alkali neutralization and water washing step, and the conventional bleaching step. This conventional process step elimination is possible because the impregnated activated carbon treatment of the present invention reduces the phospholipid and free fatty acid concentration of the degummed oil sufficiently to result in a final product which is both stable and acceptable from the standpoint of taste, color and odor. In addition, the final product is satisfactory as a consequence of the removal of other impurities in the oil, especially peroxide compounds, by the impregnated activated carbon treatment step.

In addition to the conventional refining process described above, other, often more direct, methods have been put forward in the art as improved methods of vegetable oil refining. For example, U.S. Pat. No. 2,746,867 describes a two step refining process comprising a first step of carefully controlled partial degumming by means of hydration, followed by steam deodorizing at a moderate temperature. However, this process is intended to leave at least some of the free fatty acids in the product. Similarly, U.S. Pat. No. 2,117,776 describes a two step process comprising removal of the phospholipids from the crude oil, preferably by precipitation with a non-solvent, followed by high vacuum-short path distillation of the oil.

As already noted above, it is known to employ activated carbon conventionally as a bleaching agent, that is, as a decolorizing agent to remove various pigment products. When employed as a bleaching agent, the activated carbon is typically utilized in powder form in a batch or continuous batch-type operation. Conventionally, such use takes place before the vacuum distillation deodorization step. Nevertheless, the art has preferred to employ activated clays as bleaching agents rather than activated carbons due to their greater cost effectiveness, a result of the much greater holding capacity of the activated carbons for the vegetable oil, as compared to the activated clays.

However, it is known to employ activated carbons in various ways in vegetable oil refining processes. For example, John P. Harris and Bernard N. Glick, in "Crude Cotton Oil Filtration", *Oil & Fat Industries*, pp. 263–265, September, 1928, suggest activated carbon filtration of crude cotton oil to remove certain colloids and other impurities prior to the conventional refining process. U.S. Pat. No. 3,455,975, concerned with a refining process wherein deacidification and deodorization of glyceride oils is accomplished by distillation in a steam current under vacuum, also discloses decolorization pretreatment with artificially activated montmorillonite earth and activated carbon.

Finely divided activated carbon impregnated with, or admixed with, an alkaline material has been employed in purification of oils. See U.S. Pat. Nos. 1,105,744, 1,705,824, 1,705,825, and 2,105,478.

The MgO impregnated activated carbon of the present invention represents a novel catalyst composition. U.S. Pat. No. 3,817,874 discloses a method of forming high surface carbons by treating a porous carbon with MgO, among other materials, followed by heating of the carbon in the presence of $CO_2$, and then by washing out of all the inorganic materials, but does not teach the impregnated activated carbon of the present invention.

A process for refining edible glyceride oils by treating them with activated magnesium oxide is disclosed in U.S. Pat. No. 2,454,937. Ordinary magnesium oxide, however, is stated to be inactive, and it is said that activation may be accomplished by heating the magnesium oxide with water to about 100° C. for about one hour, filtering, drying and heating in the range of 350° to 500° C. for three hours or longer.

In contrast to methods heretofore employed in the art, the method of the present invention uniquely provides for a straightforward and efficient means of preparing refined vegetable oils having a reduced content of free fatty acids, phospholipids, peroxides and other impurities which would result in an unstable product and one unacceptable in color, taste and odor.

SUMMARY OF THE INVENTION

In accordance with the improved refining process of the present invention, crude edible vegetable oils are refined by the successive steps of degumming, passing of the degummed oil through a bed of MgO impregnated activated carbon, and subjecting of the thus treated vegetable oil to vacuum steam distillation and deodorization. An edible vegetable oil refined by this process will have a reduced peroxides concentration level, a reduced final phospholipid content, and a reduced final free fatty acid concentration.

In accordance with the method of the present invention for treating a degummed vegetable oil which MgO impregnated activated carbon, the thus treated vegetable oil will have a reduced phospholipid content such that the oil will exhibit a negative acid heat break test result; and the oil will have a reduced free fatty acid content, less than about 0.1% by weight.

For purposes of the present invention, the phospholipid level of the treated crude vegetable oil or the refined vegetable oil final product is measured in accordance with the acid heat break test. In accordance with the procedure for this test, 80 ml. of oil to be tested is placed in a breaker and 3 drops of concentrated HCl are added. The oil is then heated to 500° F. A negative test result is obtained when no flocculation of the oil occurs up to 500° F. A positive test result, indicating higher concentrations of phospholipids, is obtained when the oil darkens and flocculation of the oil occurs at temperatures below 500° F.

The free fatty acid concentration of the treated crude vegetable oil or the refined vegetable oil final product is measured in accordance with AOCS Method 5a-40. This method determines the % by weight of free fatty acids in the oil being tested, by KOH titration, using phenolphthalein indicator, of the oil dissolved in a 50/50 mixture of ethanol/isopropanol or ethanol/toluene.

The degumming step of the method of the present invention may be carried out using any conventional procedure for removing various mucilaginous products, primarily protein or albuminoid substances and phospholipids, from the crude vegetable oil. Typically, the degumming step will reduce the phospholipid content of the vegetable oil to about 200 to 250 p.p.m., measured as phosphorus. However, it has been possible to obtain phospholipid levels in this degumming step of the present invention in the range of from about 50 to about 100 p.p.m. of phospholipids, and even lower, measured as phosphorus.

The preferred method of degumming the crude vegetable oil in accordance with the method of the present invention is by simple hydration of the mucilaginous product impurities contained in the vegetable oil. The hydrated mucilaginous products form a precipitate which can be separated. The amount of water employed ranges from about 1 to about 2% by weight, based on weight of crude vegetable oil to be treated. It has been found that certain agents improve the rate and amount of mucilaginous product precipitation. For example, certain acids, such as acetic acid and phosphoric acid, have been found to improve the efficiency of the degumming step. These precipitation enhancing agents are most easily employed by simply adding them before the water employed for hydration of the crude vegetable oil mucilaginous products (gums).

The degumming step may be carried out at normal temperatures and pressures. However, it is preferred to carry out the step at a temperature of from about 100° to about 160° F.

While separation of the precipitated, hydrated mucilaginous products may be accomplished simply by filtration, the rate and efficiency of separation is greatly improved by the use of equipment which permits continuous centrifuging of the hydrated crude vegetable oil gums. Indeed, it is preferred to employ equipment which will provide for high speed mixing and agitation of the acid, water and vegetable oil mixture, with subsequent centrifugal separation. Thus, pumps or other devices may be utilized to form an intimate physical mixture or emulsion of the water and oil, whereby the area of surface contact between the water and mucilaginous products in the oil is substantially increased. Then, centrifugal separators remove the water and hydrated mucilaginous products to yield demucilaginated oil.

Desirably, the various types of equipment described above will be utilized in such a way that they operate to provide continuous processing of the vegetable oil. Also, multiple cycling of the oil and water can improve the performance results of the process.

Alternatively, the degumming step may be carried out using steam to replace the water for hydration of the mucilaginous products in the vegetable oil. The emulsion formed is then separated by centrifuging in the same manner as for the emulsion formed with water in the conventional process.

Subsequent to the degumming step, there may be employed, desirably, a step of water washing of the degummed vegetable oil, for the purpose of removing additional amounts of precipitated mucilaginous products and any contaminants that may have been introduced into the vegetable oil during the degumming step.

The step of MgO impregnated activated carbon treatment comprises passing the previously degummed vegetable oil through a bed of granular activated carbon impregnated with from about 1.0 percent to about 15.0 percent by weight of MgO. The use of impregnated granular activated carbon in a bed to treat vegetable oil is a basic departure from the conventional use of activated carbons as bleaching agents, where they are normally employed in powder form and in batch or continuous batch-type operations, which is a less complicated manner of utilizing activated carbon than the bed system. However, as has already been pointed out, the impregnated activated carbon treatment step of the present invention has an entirely different objective, and achieves an entirely different result, from the bleaching treatment step in which activated carbons have been utilized in the past.

By using a bed of impregnated granular activated carbon, it is possible to achieve an acceptably small effective dosage of carbon for a given quantity of oil to be treated, by reason of the possibility of regeneration of the granular activated carbon, and also by reason of the significantly lower effective equilibrium concentration adsorption levels which exist in a bed of granular activated carbon as compared to powdered activated carbon used in a batch-type operation. Thus, phospholipids could not be removed from degummed vegetable oils to the extent achieved by the activated carbon treatment step of the present invention by use of powdered activated carbon in the amounts normally employed in conventional batch-type bleaching operations.

The granular activated carbon which may be employed as the basis for the impregnated activated carbon of the present invention should fall within the mesh size range of 12×40, U.S. Sieve Series. However, the size of the activated carbon granules is not especially critical, so long as it does not vary considerably from the indicated range. The activated carbon material itself should be a conventional liquid phase activated carbon prepared from any suitable source, including petroleum, coal, wood and other vegetable raw materials. Coal based activated carbons have been found especially suitable. A preferred granular activated carbon material for use as the basis for the impregnated activated carbon of the present invention is CAL 12×40, available from the Pittsburgh Activated Carbon Division of Calgon Corporation.

Magnesium oxide, MgO, is insoluble in water and cannot, consequently, be impregnated into an activated carbon substrate simply by means of an aqueous solution followed by drying. Furthermore, it is essential to preparation of the impregnated activated carbon of the present invention that the MgO be formed or placed within the pore structure of the activated carbon. Accordingly, it has been discovered that this objective can be obtained by use of the particular preparation method of the present invention. This preparation method comprises the following steps: (a) admixing the activated carbon to be impregnated with an aqueous solution of a sufficient amount of a water soluble magnesium salt, preferably $MgCl_2.6 H_2O$, to result in from about 1.0 to about 15.0% by weight of MgO in the final activated carbon product; (b) drying said mixture; (c) admixing with the dried product of the previous step an aqueous solution of a stoichiometric amount of NaOH; (d) drying said mixture; (e) calcining the product of the previous step at a temperature of from about 550° to about 650° F. in an inert atmosphere for from about 0.25 to about 1.0 hour; (f) water washing the product of the previous step until the sodium ion concentration of the wash effluent is less than 1.0 parts per million; and (g) drying the product of the previous step to recover the final product.

It will be appreciated that other water soluble magnesium salts, in addition to $MgCl.6H_2O$, may be used with good results. For example, magnesium acetate, magnesium phosphate, magnesium borate, magnesium chlorate, magnesium chromate, magnesium nitrate, and magnesium sulfate are suitable.

The size of the column vessels used to establish the bed of MgO impregnated granular activated carbon may be varied in size, depending, essentially, on the volume of vegetable oil to be processed.

The total contact time of MgO impregnated granular activated carbon with the vegetable oil being treated may be from about 4 to about 24 hours, and preferably will be from about 6 to about 12 hours.

The preferred manner of employing the bed of MgO impregnated granular activated carbon in the process of the present invention is the pulse-bed system. This system duplicates the action of a large number of filters in series in a clean, continuous, closed system. In this system, a small amount of spent activated carbon is removed (slugged) from the bottom of each column once during every eight-hour period. The removed activated carbon is then regenerated for further use. At the same time that the spent activated carbon is removed from the bottom of each column, a corresponding amount of regenerated or virgin activated carbon is added to the top of each column bed from charge tanks located above each column.

The columns themselves are typically cone-bottomed columns ten feet in diameter and thirty feet in height, capable of holding approximately 2700 cubic feet of MgO impregnated granular activated carbon. A number of such columns would be required to process the normal output of a sizeable vegetable oil refinery, for example, approximately 60,000 pounds of vegetable oil per hour. Clearly, however, the dimensions of the columns are not especially critical and may be considerably varied to conform to space requirements or other considerations.

The spent carbon which has been removed from each column is carried by gravity to an oil recovery tank where oil is removed from the spent activated carbon by washing with a $C_5$ to $C_8$ aliphatic hydrocarbon solvent, particularly hexane. It has been found that hexane is a uniquely suitable solvent for removal of the vegetable oil trapped in the spent activated carbon since the impurities absorbed on the activated carbon are not eluted with the solvent. Hexane is also non-toxic, relatively inexpensive, and readily available. Several bed volumes washing with hexane will be sufficient to remove substantially all of the oil trapped in the spent activated carbon. In turn, removal of the hexane solvent from the activated carbon is readily accomplished using steam.

After oil recovery from the spent activated carbon, regeneration is carried out. The spent activated carbon is conveyed away from the site of steam stripping to remove hexane by means of a dewatering screw to remove excess water. The spent activated carbon is carried into a multiple hearth furnace where it is regenerated as it passes through a controlled atmosphere at high temperatures. The regenerated carbon is then ready for reuse in the overall process.

A unique advantage of the MgO impregnated activated carbon of the present invention is its relative immunity from deterioration or destruction during high temperature regeneration processes. This results from the high temperature of volatilization of the MgO, which prevents it from being removed from the activated carbon through decomposition, or otherwise. As a result, it is usually unnecessary to reimpregnate the MgO impregnated activated carbon after regeneration.

Before the regenerated carbon or virgin MgO impregnated activated carbon is placed in the column vessels for use, it usually is necessary to deaerate the activated carbon during a preliminary wetting step. It has been found that air bubbles trapped between the granules of activated carbon interfere in a material way with the efficiency of the activated carbon treatment step. The air bubbles adhere rather tenaciously to the activated carbon granules, but it has been found that they can be satisfactorily removed by agitation of the activated carbon granules together with heated degummed vegetable oil in a preliminary step.

After the step of MgO impregnated activated carbon treatment of the degummed vegetable oil, the third step of deodorizing is carried out. The deodorization is accomplished by steam distillation under vacuum in accordance with well known procedures already established in the art. The distillation is generally carried out at temperatures in the range of from about 400° to about 550° F., preferably at temperatures of from about 460° to about 530° F. The distillation is carried out at a reduced pressure of from about 1 to about 10 mm Hg., preferably at from 4 to 6 mm Hg.

Vacuum steam distillation deodorization takes advantage of the significant differences in volatility between the basic triglyceride components of the vegetable oil and the various substances which give the oil its natural odor and flavor. Thus, the relatively volatile odor and flavor causing substances in the vegetable oil are stripped from the relatively nonvolatile oil during the process of steam distillation. The function of the steam in the distillation process is the conventional one of serving as a carrier for the odor and flavor causing substances being distilled from the oil. There is ordinarily no intended chemical reaction of the steam with the oil or its components. The steam distillation is usually carried out at high temperatures in order to increase the volatility of the odor causing substances in the oil. Carrying out the steam distillation process at significantly reduced pressure protects the oil from undue hydrolysis by the steam and from atmospheric oxidation. It also greatly reduces the quantity of steam required for the process.

Deodorization by steam distillation also significantly reduces the color of the processed vegetable oil, since the cartenoid pigments responsible for the major portion of the oil color are unstable to heat.

Along with odor, flavor and color causing substances, the steam distillation process also more or less completely removes the free fatty acids in the vegetable oil. The free fatty acid content of the oil can be reduced by the deodorization process to a level in the range of from about 0.03 to 0.015% by weight, which is approximately the same level achievable by conventional alkali refining. However, since the free fatty acid distillation rate is concentration dependent, and since the distillation process results in splitting of some oil to form additional quantities of free fatty acids, an equilibrium point is reached, resulting in a minimum content of free fatty acid in the oil. Thus, use of MgO impregnated activated carbon in accordance with the present invention, by substantially reducing the free fatty acid content of the vegetable oil before the step of deodorization by steam distillation, not only reduces the extent of the deodorization process required, but also can reduce the minimum content of free fatty acid in the oil which can be achieved. Moreover, the MgO impregnated activated carbon of the present invention can also remove other organic acids, for example phosphoric acid, which may be present in the vegetable oil.

DETAILED DESCRIPTION OF THE INVENTION

An appreciation of the method of the present invention for preparing the MgO impregnated activated carbon will be gained from the following Example, which serves to illustrate the manner of carrying out that method.

EXAMPLE 1

A solution of 26.7 g. of $MgCl_2.6H_2O$ in 100 ml of distilled water was added to 100 g. of CAL 12×40 mesh U.S. Sieve Series activated carbon having an apparent density of 0.522. The activated carbon and $MgCl_2.6H_2O$ solution were mixed and then air dried overnight. A solution of 10 g. of NaOH in 100 ml of distilled water was then added to the air dried carbon and thoroughly mixed therewith. The mixture was then air and oven dried at 100° C. overnight. The dried carbon was then calcined at 600° F. under a $N_2$ atmosphere for one-half hour. Before calcining, the dried carbon weighed 128.7 g., and after completion of the calcining, weighed 109.8 g., thus experiencing a weight loss of 18.9 g. during the calcining process. The apparent density of the carbon after calcining was 0.586.

After calcining, the carbon was subjected to water washing to remove NaCl. One bed volume was 167.3 cc. and the water washing was carried out using deionized water at the rate of 1673 cc./hr., or 28 cc./min. The $Na^{\oplus}$ concentration of the effluent was measured, with the following results:

| Bed Volumes | 1 | 5 | 10 | 12 | 15 | 20 | 25 | 30 | 35 |
|---|---|---|---|---|---|---|---|---|---|
| Na$^\oplus$ Concentration (p.p.m.) | 20,000 | 35 | 3.0 | 2.25 | 1.65 | 1.2 | 0.8 | 0.6 | 0.6 |

For comparison, water washing was carried out by soaking of the carbon overnight in different bed volumes of deionized water. The following results were obtained:

| Bed Volumes | 1 | 5 | 10 |
|---|---|---|---|
| Na$^\oplus$ Concentration (p.p.m.) | 5.5 | 0.85 | 0.4 |

After water washing, the MgO impregnated activated carbon was placed in an oven at 100° C. until dry. The apparent density of the impregnated carbon was 0.561, and the impregnated amount of MgO was 5.0% by weight.

EXAMPLE 2

The MgO impregnated activated carbon prepared as described in Example 1 was evaluated with respect to its efficiency in removing both phospholipids and free fatty acids from a sample of degummed soya oil. The degummed soya oil was divided into aliquots and passed through columns containing different loadings of MgO impregnated activated carbon to result in dosages of 1.0, 3.0, 5.0 and 10.0 g. of carbon per 100 g. of soya oil. A total contact time of 4.0 hours was employed and the process was carried out at a temperature of 93° C.

Phospholipid removal was measured by the conventional acid heat break test. For this evaluation, an 80 ml sample of oil was placed in a beaker and 3 drops of concentrated HCl was added to the oil. The oil was then heated to 500° F. using a Bunsen burner. The oil was observed for the formation of "break", that is, the deposit of impurities, primarily phospholipids and other mucilaginous materials, in the form of flocculent particles. A negative test result was obtained when no flocculation occurred at temperatures up to 500° F. A positive test result was obtained when flocculation occurred at temperatures of less than 500° F. In addition, the temperature at which flocculation occurred was noted. The following table of values illustrates the results obtained:

| Dosage (g. of MgO impregnated activated carbon/100 g. of soya oil) | Test Result | Temperature of Break Formation (° F.) |
|---|---|---|
| Blank | + | 454 |
| 1.0 | + | 480 |
| 3.0 | − | >500 |
| 5.0 | − | >500 |
| 10.0 | − | >500 |

Free fatty acid removal was measured in accordance with the procedures described in AOCS Method 5a-40. Following these procedures, samples of treated soya oil were titrated with a KOH solution, using phenolphthalein as a neutral point indicator. Before titration, the oil sample was dissolved in a 50/50 mixture of ethanol/toluene. The results of the evaluation are illustrated in the following table of values:

| Dosage (g. of MgO impregnated activated carbon/100 g. of soya oil) | Free Fatty Acid (% by weight) |
|---|---|
| Blank | 0.239 |
| 1.0 | 0.172 |
| 3.0 | 0.132 |
| 5.0 | 0.090 |
| 10.0 | 0.042 |

The MgO impregnated activated carbon of the present invention provides improved results over those which can be obtained using either a physical mixture of MgO and activated carbon, or the activated carbon alone. The MgO impregnated activated carbon of the present invention also provides results which are comparable to those which can be obtained using a NaOH impregnated activated carbon, as has been suggested heretofore in the art. And, the MgO impregnated activated carbon of the present invention is not affected by the high temperatures encountered in thermal regeneration processes, as would a NaOH impregnated activated carbon.

In order to illustrate the comparative performance of the MgO impregnated activated carbon of the present invention, its ability to remove phospholipids and free fatty acids was evaluated along with the abilities of virgin activated carbon, caustic impregnated carbon, and a physical mixture of MgO and activated carbon, to remove phospholipids and free fatty acids. The comparison is described in the following Example.

EXAMPLE 3

Samples of degummed soya oil were contacted with varied amounts of test carbons sufficient to give dosages of 1.0, 3.0, 5.0, and 10.0 g. of test carbon per 100 g. of soya oil. The following test carbons were employed: (1) the MgO impregnated activated carbon of the present invention containing 3.6% by weight of MgO; (2) virgin CAL 12×40 mesh activated carbon; (3) 12×40 CAL impregnated with 5% by weight of NaOH; and (4) Cane CAL$^R$, available from the Pittsburgh Activated Carbon Division of Calgon Corporation, consisting of a physical mixture of 12×40 mesh CAL activated carbon and about 7.0% by weight of MgO. The total contact time of soya oil and test carbon was 4.0 hours and the treatment was carried out at 93° C. The test carbon was removed from the treated samples by suction filtration on a Buchner funnel using Whatman #3 for the top, and Whatman #42 for the bottom filter papers. Measurement of phospholipid removal was by means of the acid heat break test, described in Example 2; and measurement of free fatty acid removal was by means of AOCS Method 5A-40, also described in Example 2. The results of the comparative evaluation are set out in the table of values below.

| Adsorbent | Dosage (g. adsorbent/100 g. soya oil) | Free Fatty Acid (% by weight) | Acid-Heat Break Temp. (° F.) |
|---|---|---|---|
| MgO impregnated CAL | Blank | 0.239 | 462 |
| | 1.0 | 0.172 | 484 |
| | 3.0 | 0.132 | >500° |
| | 5.0 | 0.090 | >500 |
| | 10.0 | 0.042 | >500 |
| Virgin CAL | Blank | 0.235 | 455 |
| | 1.0 | 0.223 | 470 |
| | 3.0 | 0.211 | 464 |

-continued

| Adsorbent | Dosage (g. adsorbent/100 g. soya oil) | Free Fatty Acid (% by weight) | Acid-Heat Break Temp. (° F.) |
|---|---|---|---|
| | 5.0 | 0.201 | 472 |
| | 10.0 | 0.182 | >500 |
| 5% NaOH impregnated CAL | Blank | 0.235 | 455 |
| | 1.0 | 0.063 | 464 |
| | 3.0 | 0.027 | >500 |
| | 5.0 | 0.020 | >500 |
| | 10.0 | 0.017 | >500 |
| Cane CAL ® | Blank | 0.239 | 462 |
| | 1.0 | 0.219 | 463 |
| | 3.0 | 0.029 | 466 |
| | 50 | 0.199 | 490 |
| | 10.0 | 0.188 | >500 |

An appreciation of the various stages of the treatment steps of the improved refining process of the present invention can be gained from the detailed description which follows.

EXAMPLE 4

Crude soybean oil as available from an extraction plant is usually processed further at that location, for recovery of lecithin.

In this process, water is the sole degumming agent. The crude soybean oil from an extraction plant is at a temperature of 125° F. in a storage tank. The phosphorus content is 650 p.p.m., which corresponds to a phospholipid content of 1.95%. It is then pumped through a line at a rate of 30,000 pounds per hour, and water is metered into this line by a water flow controller at a rate of 1.0% or 300 pounds per hour. The initial mixing of water and oil is done in a pump. The mixture is pumped at a pressure of 120 PSIG into another line where, a flow control valve is regulated for a flow rate of 30,300 pounds of crude soybean oil and water. The mixture is then pumped upward into a mixer which is equipped with a 2 H.P. motor drive and two 14 inch diameter three-bladed propellers operating at 180 R.P.M. There are two horizontal baffles for thorough mixing.

The agitated mixture of oil and water then flows by way of another line to a De Laval SRG 214 centrifuge operating at a speed of 4,400 R.P.M. The partially degummed soybean oil flows into another line where the back pressure on this oil phase is controlled by a back pressure controller and then flows into a storage tank. The separated wet gums flow into a line where the back pressure is controlled by a back pressure controller, and then into a tank. The back pressure controllers are of known type and automatically control the operation of the separator.

The partially degummed oil has a phosphorus content of 200 p.p.m. which corresponds to 0.6% of phospholipids. The quantity of wet gums is 900 pounds per hour or 3.0% of the oil feed. The analysis of the wet gums is 33% water, 45% phospholipids and 22% soybean oil. The wet gums are then further processed for making commercial lecithin. The yield of partially degummed oil is 29,400 pounds per hour or 98% yield on a dry basis.

A more complete degumming of crude soybean oil may be achieved by acid degumming as illustrated in the following example.

EXAMPLE 5

The feed material is the partially degummed crude soybean oil from Example 4 which contains 0.6% phospholipids. It is pumped to a heater where it is heated to a temperature of 140° F. The pressure in the line to the heater is 130 PSIG. A flow control valve is set to regulate the flow rate at 29,400 pounds per hour for the oil leaving the heater. Into this oil a supply of 85% phosphoric acid is metered with a metering pump at a rate of 0.12% or 34.8 pounds per hour. This equals 0.10% on a 100% acid basis. The oil-acid mixture then flows into a mixer which is similar to the mixer described in Example 4, except that it is of stainless steel construction and there is only a 1 minute retention time. The flow is then into a line where a water supply thereto is regulated by means of a flow control valve to supply 3% of water or 882 pounds per hour. The flow is then into a mixer which is similar to the mixer in Example 4, and then into a centrifuge which is similar to that employed in Example 4. The wetted gums flow into a tank through an automatic back pressure valve. The amount of wet gums is 1,285 pounds per hour containing 70% water, 10% phospholipids and 20% crude soybean oil. It is processed further or otherwise diposed. The degummed oil is pumped through a line provided with an automatic back pressure valve. The pump has an automatic equalizer. The pump pressure is 120 PSIG. The flow then is to a heater in which the oil is heated to 180° F. A separate pipe line supplies hot softened water at 190° F. to the oil, and the flow is controlled by a flow control valve at a rate of 20% or 5,800 pounds per hour. The oil and water mixture is then separated in a centrifuge. The wash waters flow into a waste water tank through an automatic back pressure valve. The washed oil flows into a tank through an automatic back pressure valve. The washed oil yield is 29,014 pounds per hour containing 0.3% moisture and 60 p.p.m. of phospholipids, measured as phosphorus. The dry weight is 28,927 pounds per hour.

EXAMPLE 6

The degummed soya oil, treated in accordance with the procedures of any of the preceding examples, is next subjected to the MgO impregnated activated carbon treatment step of the present invention. Degummed soya oil is carried to a pre-filter feed tank where it is stored until pre-filtration and subsequent processing is carried out. At that time the degummed soya oil is pumped to a pre-filter, which may be of any construction suitable for removing suspended particulate matter from the degummed oil. A paper filter may be employed. The sludge of removed suspended particulate matter is eliminated. The pre-filtered oil is next transported to an adsorber feed tank, which is insulated. If necessary, the oil may be refiltered. The oil is now ready for passage through the activated carbon adsorbers and is pumped through lines to a series of adsorber columns. The number of adsorber columns employed will vary according to the volume of oil being processed. The adsorber columns are insulated as well as being heat traced, primarily at the bottom conical portion, for example by small steam lines. After passing upwardly through the activated carbon adsorption columns, the oil is then transported to a post-filter feed tank. If additional activated carbon adsorption treatment is required, the oil may be transported back to the adsorber feed tank. From the post filter feed tank the oil is pumped to a post-filter which is similar in construction to the prefilter and is especially suitable for removing any activated carbon fines which may have become entrained in the oil during passage through the activated carbon adsorber columns. The sludge of removed fines is eliminated. The post-filtered oil is now ready for the final step of steam distillation deodorization and is transported to the apparatus for carrying out this step.

The adsorber columns are operated as pulse beds and so require continual removal of exhausted or loaded activated carbon for reactivation, and a corresponding continual replenishing of fresh MgO impregnated activated carbon for the adsorber column. Fresh activated carbon, either virgin MgO impregnated carbon or reactivated MgO impregnated carbon, is supplied to each of the adsorber columns through insulated charge tanks. In these charge tanks the activated carbon is mixed with previously refined oil. This refined oil is carried to a refined oil storage tank from a location elsewhere in the process stream suitable for providing refined oil. The refined oil is pumped to each of the charge tanks. Fresh MgO impregnated activated carbon is introduced into the charge tanks. The charge tanks are pressurized by a pressurizing medium which is preferably compressed air, but may be, for example, nitrogen. The charge tanks are vented through a line.

After the MgO impregnated activated carbon is loaded, that is, exhausted by adsorption to practical capacity, it is removed from the adsorber columns and carried to a product recovery column which is vented. The product recovery column is insulated and pressurized. A fraction of the oil is transferred under pressure to the adsorber feed tank. Then the remaining oil is removed from the MgO impregnated activated carbon by upflow desorption with hexane supplied from a hexane storage tank. The mixture of oil and hexane is recovered from the product recovery column. This mixture is carried to a hexane/oil storage tank. This hexane/oil mixture may subsequently be removed to an extraction plant or other location where the hexane and oil are, in turn, separated. The hexane is, in turn, removed from the MgO impregnated activated carbon by steam stripping. The steam is introduced into the product recovery column and the mixture of steam and hexane is carried away from the product recovery column. The hexane is recovered from the steam and hexane mixture by condensing of the mixture in a condenser cooled by water. The hexane is decanted and carried to the hexane/oil storage tank. The separated water is sewered.

The desorbed MgO impregnated carbon is now ready for reactivation and is transported from the product recovery column to a desorbed carbon storage tank. The desorbed carbon is transported as a slurry, prepared from water, and the slurry is then dewatered in a dewatering screw, after which the carbon is introduced into a reactivtion furnace. The furnace is supplied with fuel and combustion air. Steam is also utilized and is supplied through a separate line. Air for cooling is supplied to the furnace through a pump. The by-products of the reactivation are first treated in an afterburner. They are then removed to a scrubber supplied with water which is then sewered. Innocuous final products are exhausted to the atmosphere by means of an induction fan. After reactivation, the MgO impregnated carbon is carried to a cooler which employs water as a cooling medium, with the aid of a water cooler and pump. After cooling, the MgO impregnated reactivated carbon is carried by means of a reactivated carbon transfer elevator to the charge tanks for the series of adsorber columns.

EXAMPLE 7

The degummed and MgO impregnated activated carbon treated soya oil prepared in accordance with the procedures of the preceding Examples is now ready for the final step of steam distillation deodorization under vacuum. The distillation is carried out at approximately 500° F. and at a reduced pressure of approximately 1.5 mm Hg. The distillation is carried out for approximately four hours while steam is supplied to the oil at the rate of 10 pounds per minute. The recovered oil is of acceptable taste, odor and color, and has a phospholipid content, measured as phosphorus, of less than 5.0 p.p.m.

What we claim is:

1. A process for making a refined edible vegetable oil, comprising the steps of:
    degumming a crude vegetable oil;
    passing the degummed vegetable oil through a bed of granular activated carbon impregnated with from about 1.0 percent to about 15.0 percent by weight of MgO; and
    subjecting the treated vegetable oil to steam distillation at reduced pressure.

2. The process of claim 1 wherein the degumming is accomplished by hydration of the crude vegetable oil.

3. The process of claim 1 wherein the degumming is accomplished by hydration and acid treatment of the crude vegetable oil.

4. The process of claim 1 wherein the steam distillation is carried out at a temperature of from about 400° to about 550° F. and at a pressure of from about 1 to about 10 mm Hg.

5. A method of decolorizing a crude vegetable oil and removing organic acids from said vegetable oil, comprising:
    passing said vegetable oil through a bed of granular activated carbon impregnated with from about 1.0 percent to about 15.0 percent by weight of MgO.

6. A method of decolorizing a degummed vegetable oil and removing organic acids from said vegetable oil, comprising:
    passing said vegetable oil through a bed of granular activated carbon impregnated with from about 1.0 percent to about 15.0 percent by weight of MgO.

* * * * *